UNITED STATES PATENT OFFICE.

MILES FRANKLIN FETTY, OF KANSAS CITY, MISSOURI, ASSIGNOR TO CHARLES F. HUTCHINGS, JR., OF KANSAS CITY, KANSAS.

ANTILEAK TIRE COMPOUND.

1,065,038. Specification of Letters Patent. Patented June 17, 1913.

No Drawing. Application filed September 23, 1912. Serial No. 721,966.

*To all whom it may concern:*

Be it known that I, MILES FRANKLIN FETTY, a citizen of the United States, residing at Kansas City, in the county of Jackson and State of Missouri, have invented certain new and useful Improvements in Antileak Tire Compounds, of which the following is a specification.

My invention relates to an antileak compound, and my object is to provide a new compound of this character, whereby punctures in pneumatic tires, such as are employed on automobiles and bicycles, are quickly closed, thereby preventing the escape of air therefrom.

My composition consists of the following ingredients, preferably, combined in the following proportions:

| | | |
|---|---|---|
| Asbestos fiber | 80 | pounds. |
| Glucose | 1 | gallon. |
| Corn starch | 5 | pounds. |
| Bulk starch | 5 | pounds. |
| Glycerin | $3\frac{1}{3}$ | gallons. |
| Alcohol | $16\frac{2}{3}$ | gallons. |
| Water | 54 | gallons. |

These ingredients are thoroughly mixed together, the two kinds of starch being cooked together before they are intermingled with the remainder of the ingredients.

The glycerin and alcohol may be omitted in warm weather, as they are employed principally to prevent the compound from freezing in very cold weather.

In practice, about one quart of the compound is introduced into a three inch tire, the quantity being increased in proportion for larger tires. The compound remains in a liquid state and flows within the tire as the same rotates, so that should the tire become punctured by a nail or other obstacle, a portion of the compound will immediately enter and seal the puncture.

Having thus described my invention, what I claim and desire to secure by Letters-Patent is:

1. The herein-described composition of matter for sealing punctures in pneumatic tires and the like, consisting of asbestos fiber eighty pounds, glucose one gallon, corn starch five pounds, bulk starch five pounds, water fifty-four gallons.

2. The herein-described composition of matter for sealing punctures in pneumatic tires and the like, consisting of asbestos fiber eighty pounds, glucose one gallon, corn starch five pounds, bulk starch five pounds, glycerin three and one-third gallons, alcohol sixteen and two-thirds gallons, water fifty-four gallons.

In testimony whereof I affix my signature, in the presence of two witnesses.

MILES FRANKLIN FETTY.

Witnesses:
F. G. FISCHER,
L. J. FISCHER.